United States Patent
Clark (10) Patent No.: US 10,460,313 B1
(45) Date of Patent: Oct. 29, 2019

(54) SYSTEMS AND METHODS OF INTEGRATED IDENTITY VERIFICATION

(71) Applicant: United Services Automobile Association (USAA), San Antonio, TX (US)

(72) Inventor: Thomas D. Clark, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 987 days.

(21) Appl. No.: 14/970,092

(22) Filed: Dec. 15, 2015

Related U.S. Application Data (60) Provisional application No. 62/091,889, filed on Dec. 15, 2014.

(51) Int. Cl.
| | |
|---|---|
| *G06Q 20/38* | (2012.01) |
| *H04L 29/06* | (2006.01) |
| *G06Q 20/36* | (2012.01) |
| *G06Q 20/32* | (2012.01) |
| *G06F 16/903* | (2019.01) |

(52) U.S. Cl.
CPC ....... *G06Q 20/3821* (2013.01); *G06F 16/903* (2019.01); *G06Q 20/322* (2013.01); *G06Q 20/3674* (2013.01); *H04L 63/083* (2013.01); *H04L 63/0815* (2013.01)

(58) Field of Classification Search
CPC .............. G06Q 20/322; G06Q 20/3821; H04L 63/0815
See application file for complete search history.

(56) References Cited

U.S. PATENT DOCUMENTS

| | | | | |
|---|---|---|---|---|
| 7,017,187 B1* | 3/2006 | Marshall | ............... | H04L 63/145 |
| | | | | 713/188 |
| 7,496,751 B2* | 2/2009 | de Jong | .................. | G06F 21/33 |
| | | | | 713/155 |
| 7,721,328 B2* | 5/2010 | Boulos | ..................... | G06F 21/33 |
| | | | | 726/6 |
| 8,281,378 B2* | 10/2012 | Anderson | ............. | H04L 9/0894 |
| | | | | 709/218 |
| 8,695,075 B2* | 4/2014 | Anderson | ............. | H04L 9/3213 |
| | | | | 726/8 |

(Continued)

*Primary Examiner* — Steven S Kim
(74) *Attorney, Agent, or Firm* — Kane Kessler, P.C.; Barry E. Negrin (57) ABSTRACT

A system of electronic identity verification across multiple services is provided and includes a password vault module adapted to enable a user to store a plurality of credentials for respective services of the user's choosing as well as a federated identity module adapted to enable a user to provide a single sign-on credential for a plurality of subscribing services. A common login module is accessible to both the password vault module and the federated identity module. When the user logs into the common login module, the user is authenticated for both services of the user's choosing and subscribing services. The system migrates stored user credentials in the password vault module to the federated identity module when a user-chosen service becomes a subscribing service. An integrated mobile wallet module enables financial transactions between the user and both the user-chosen services and subscribing services.

22 Claims, 4 Drawing Sheets

(56) References Cited

U.S. PATENT DOCUMENTS

| | | | | |
|---|---|---|---|---|
| 9,473,912 | B2* | 10/2016 | Circosta | H04W 88/182 |
| 2002/0010776 | A1* | 1/2002 | Lerner | H04L 63/0815 |
| | | | | 709/225 |
| 2003/0220805 | A1* | 11/2003 | Hoffman | G06Q 10/10 |
| | | | | 705/313 |
| 2005/0192973 | A1* | 9/2005 | Sperling | G06F 16/273 |
| 2006/0021010 | A1* | 1/2006 | Atkins | H04L 29/06 |
| | | | | 726/5 |
| 2008/0263629 | A1* | 10/2008 | Anderson | H04L 9/0894 |
| | | | | 726/2 |
| 2010/0268778 | A1* | 10/2010 | Kim | G06Q 10/10 |
| | | | | 709/204 |
| 2011/0023129 | A1* | 1/2011 | Vernal | G06F 21/6245 |
| | | | | 726/28 |
| 2011/0125894 | A1* | 5/2011 | Anderson | H04L 9/3213 |
| | | | | 709/224 |
| 2013/0198516 | A1* | 8/2013 | Fenton | H04L 63/0869 |
| | | | | 713/168 |
| 2014/0013116 | A1* | 1/2014 | Smith | H04W 12/06 |
| | | | | 713/168 |
| 2014/0245396 | A1* | 8/2014 | Oberheide | H04L 63/08 |
| | | | | 726/4 |
| 2015/0089620 | A1* | 3/2015 | Manza | H04L 63/0838 |
| | | | | 726/8 |
| 2016/0094546 | A1* | 3/2016 | Innes | H04L 63/0823 |
| | | | | 713/156 |
| 2016/0366122 | A1* | 12/2016 | Rykowski | H04W 12/06 |

* cited by examiner

| | |
|---|---|
| Facebook | JohnSmith75 |
| | password123 |
| Yahoo! | JohnSmith75 |
| | password123 |
| Gmail | johnsmith75999 |
| | Password123 (note capital P) |
| USAA | JohnSmith75 |
| | password@2014 |
| CPi | JohnSmith75ESQ |
| | PatentPassword1999 |

SYSTEMS AND METHODS OF INTEGRATED IDENTITY VERIFICATION

RELATED APPLICATIONS

Priority is claimed from U.S. Provisional Patent Application No. 62/091,889 filed Dec. 15, 2014, entitled "SYSTEMS AND METHODS OF INTEGRATED IDENTITY VERIFICATION", the teachings of which are incorporated by reference herein.

BACKGROUND OF THE INVENTION

Field of the Invention

The invention is directed to online identity verification. More specifically, the invention is directed to systems and methods for enabling a user to move seamlessly from multiple websites and/or apps with a single identity verification step while protecting the user from being hacked and being the victim of concomitant identity theft.

Description of Related Art

Many consumers and online users use multiple and various online and mobile services, each of which requires a unique User ID and Password. As online and mobile tools have become increasingly part of our lives, it has become increasingly difficult for a consumer to remember the unique account credentials across his/her many accounts. Using the same credentials for all services is dangerous, because once one service is breached, the user's entire online existence is compromised. Additionally, many services have varied requirements for credentials (must include a number/symbol, cannot include a number/symbol, must include both capital and lowercase letters, password cannot include userID, etc.). As such, nearly all users have a long list of credentials of which they need to keep track.

Figure 1:
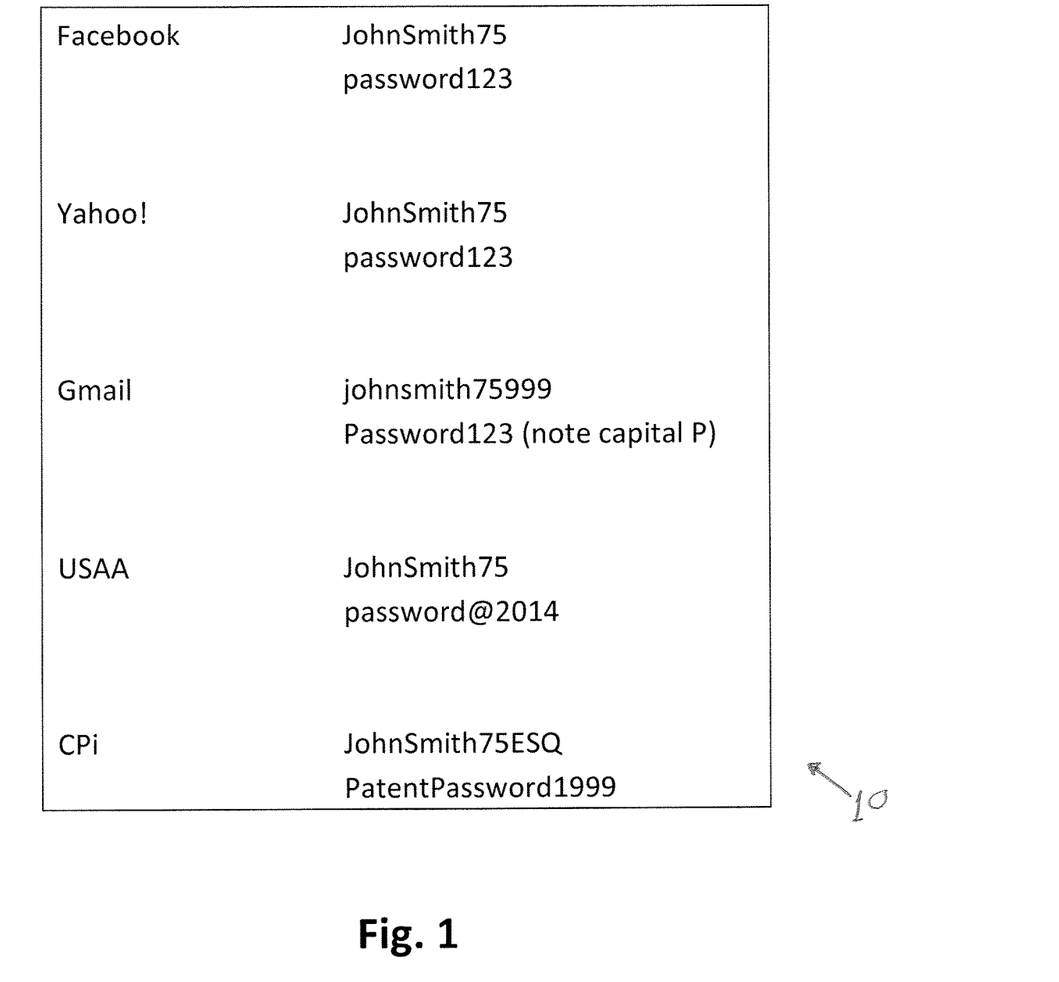
FIG. 1 is a schematic illustration of a conventional chart for storing multiple IDs and passwords.

Consumers/users currently solve this problem by writing their credentials on a piece of paper or saving them in an unprotected file (e.g., Microsoft Word or Microsoft Excel) on their computers. A schematic example of this "solution" is illustrated in FIG. 1 as chart 10. The user has written down in the left-hand column the website or app (also referred to herein as a service) and the corresponding User ID and Password combination in the right hand column. While this is easy to implement for many people, it has clear drawbacks. First and foremost, if the consumer's list is compromised, e.g., a thief gets ahold of the piece of paper or hacks into the file on the computer, the thief has a list of all of the consumer's credentials and can easily wreak havoc or outright steal the person's identity. Second, if the consumer needs to access a service but does not have access to his/her special piece of paper or computer file (e.g., he/she is travelling), then chart 10 is of no help to the consumer.

Some consumers use a conventional "Password Vault" application that allows them to store their credentials in encrypted form either on a mobile device or on their computers. The user of these services use a single password to gain access to their password vault.

A third way that consumers solve this problem is by using a "federated identity provider" such as those provided by social media. This allows consumers to sign into multiple sites using a single identity.

The continuing challenge is that all of these solutions are fragmented, and not all sites participate in identity federation. A second challenge is that many users do not trust social media third party identity providers because they have a reputation for mining user data and violating user privacy. No single trusted entity has successfully brought all identity solutions into a single solution with easy access that also enables secure financial transactions to occur between the consumer and the various services.

Thus, there is a long-felt need to provide an integrated identity verification solution together with a mobile financial wallet to enable not just access to multiple services with a single login but financial interactions with multiple services with a single login in a secure manner.

SUMMARY OF THE INVENTION

The invention is a system and method of verifying a user's identity and enabling secure online transactions. A single identity hub is provided that includes three primary components: a mobile wallet that enables the user to perform financial transactions over the internet or via apps with a single verification step; a password vault that enables the user to store his/her various authentication/verification credentials (e.g., user ID and password, and/or biometrics, etc.) for multiple services in a single place requiring a single identity verification; and a federated identity provider for providing a single identity for multiple services that subscribe.

Consumers use a single set of login credentials to enter the system, for example, via the mobile wallet or at a website. Once the consumer has been authenticated/verified, he/she has easy connectivity to both a password vault and federated third party sites and an easy migration path from password vault to identity federation as services join the identity federations. If credentials are saved in the password vault, the identity hub can utilize the URL and provide one-click connectivity to any site. The mobile wallet also includes an embedded token that can be used to support authentication to third-party sites that require two-factor authentication. More particularly, the invention includes a system of electronic identity verification across multiple services. A password vault module is adapted to enable a user to store a plurality of credentials for respective services of the user's choosing, and a federated identity module is adapted to enable a user to provide a single sign-on credential for a plurality of subscribing services. A common login module is accessible to both the password vault module and the federated identity module. When the user logs into the common login module, the user is authenticated for both services of the user's choosing and subscribing services. Preferably, the system migrates stored user credentials in the password vault module to the federated identity module when a user-chosen service becomes a subscribing service. Preferably, the system includes an integrated mobile wallet module adapted to enable financial transactions between the user and both the user-chosen services and subscribing services. Optionally, the mobile wallet includes an embedded token adapted to support authentication to services that require two-factor authentication. In the inventive system, the user can select whether to share personal data with a given service or not upon establishing user authentication with the given service, the given service being either a user-chosen service or a subscribing service. Optionally, the device the user uses to access the system is registered with the system for additional security.

The invention also includes a method of electronic identity verification across multiple services. The steps of the method include providing a password vault module adapted to enable a user to store a plurality of credentials for respective services of the user's choosing; providing a federated identity module adapted to enable a user to provide a single sign-on credential for a plurality of subscribing services; and providing a common login module accessible to both the password vault module and the federated identity module. When the user logs into the common login module, the user is authenticated for both services of the user's choosing and subscribing services. The method preferably includes the step of migrating stored user credentials in the password vault module to the federated identity module when a user-chosen service becomes a subscribing service. The method optionally includes the step of providing an integrated mobile wallet module adapted to enable financial transactions between the user and both the user-chosen services and subscribing services; when the user logs into the common login module, the user is authenticated for the mobile wallet module. The mobile wallet module providing step may optionally further include the step of providing an embedded token adapted to support authentication to services that require two-factor authentication. Optionally, the method may include the step of enabling the user to select whether to share personal data with a given service or not upon establishing user authentication with the given service, either a user-chosen service or a subscribing service. Optionally, the method further includes the step of registering the device the user uses to access the system with the system.

The inventive method may further include the steps of querying the user to determine if the user wants to federate user credentials for a subscribing service; and if the user agrees during the querying step, extracting the relevant credentials from the user's password vault and incorporating the relevant credentials into the federated identity module. Optionally, the method further includes the step of purging credentials from the password vault module that appear in the federated identity module.

The invention also includes a non-transitory computer readable medium for electronic identity verification across multiple services having computer-readable instructions to carry out the steps of: providing a password vault module adapted to enable a user to store a plurality of credentials for respective services of the user's choosing; providing a federated identity module adapted to enable a user to provide a single sign-on credential for a plurality of subscribing services; and providing a common login module accessible to both the password vault module and the federated identity module. When the user logs into the common login module, the user is authenticated for both services of the user's choosing and subscribing services. Preferably, further computer-readable instructions may carry out the further step of migrating stored user credentials in the password vault module to the federated identity module when a user-chosen service becomes a subscribing service. Preferably, further computer-readable instructions may carry out the further step of providing an integrated mobile wallet module adapted to enable financial transactions between the user and both the user-chosen services and subscribing services; when the user logs into the common login module, the user is authenticated for the mobile wallet module. Optionally, further computer-readable instructions may carry out the further step of providing an embedded token adapted to support authentication to services that require two-factor authentication. Further computer-readable instructions may carry out the further step of enabling the user to select whether to share personal data with a given service or not upon establishing user authentication with the given service, either a user-chosen service or a subscribing service. Optionally, further comprising computer-readable instructions to carry out the further step of registering the device the user uses to access the system with the system.

Optionally, the inventive non-transitory computer readable medium may further include computer-readable instructions to carry out the further steps of: querying the user to determine if the user wants to federate user credentials for a subscribing service; and if the user agrees during the querying step, extracting the relevant credentials from the user's password vault and incorporating the relevant credentials into the federated identity module. Optionally further computer-readable instructions may carry out the further step of purging credentials from the password vault module that appear in the federated identity module.

DETAILED DESCRIPTION OF THE INVENTION AND DRAWINGS

Description will now be given with reference to the attached FIGS. 1-4. It should be understood that these figures are exemplary in nature and in no way serve to limit the scope of the invention, which are defined by the claims appearing hereinbelow.

Figure 4:
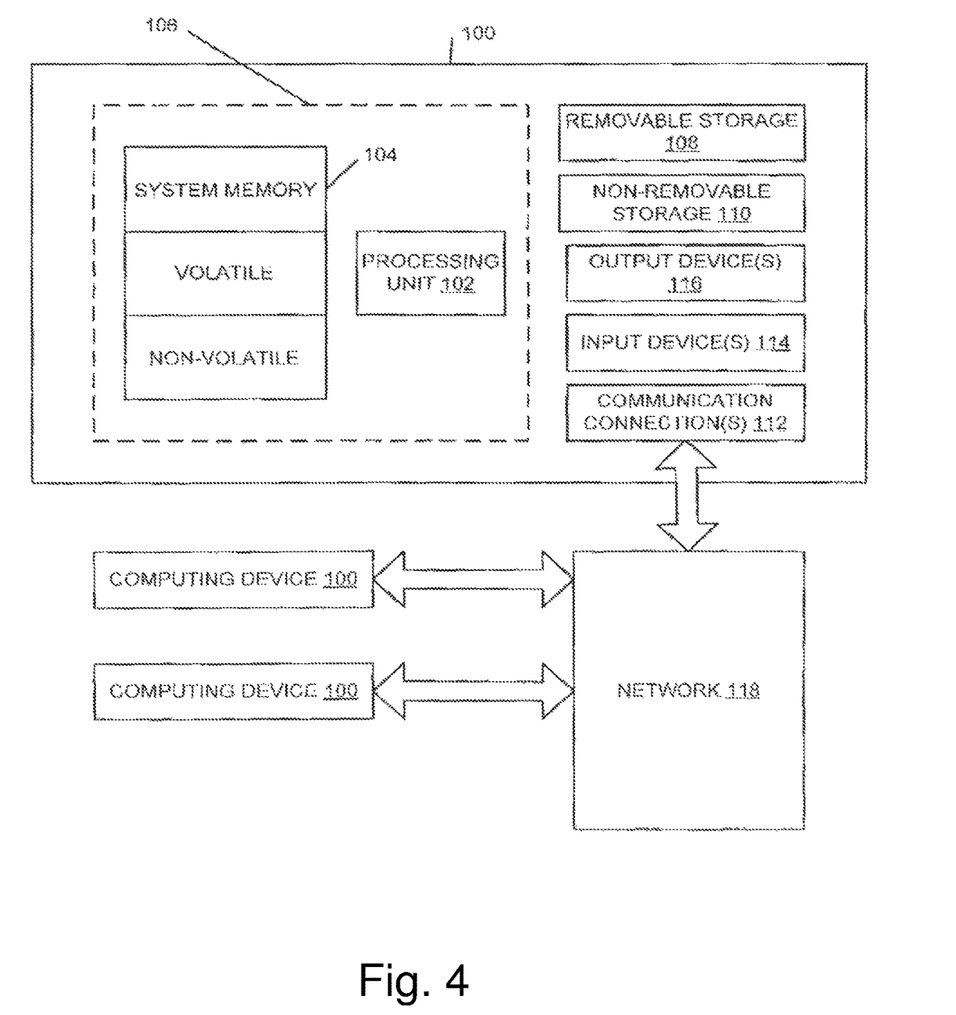
FIG. 4 is a block diagram of an exemplary computing environment within which various embodiments of the invention may be implemented.

FIG. 4 depicts an exemplary computing environment in which various embodiments of the invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types.

Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 4 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 inter-connected by a network 118, as is shown in FIG. 4. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

As mentioned above, online consumers/users have traditionally kept all of their passwords on a single piece of paper or in a computer file as graphically represented in FIG. 1 as chart 10. This method is not secure, not portable, and generally a poor solution to the problem of keeping track of multiple sets of authentication information respectively for multiple online services.

Figure 2:
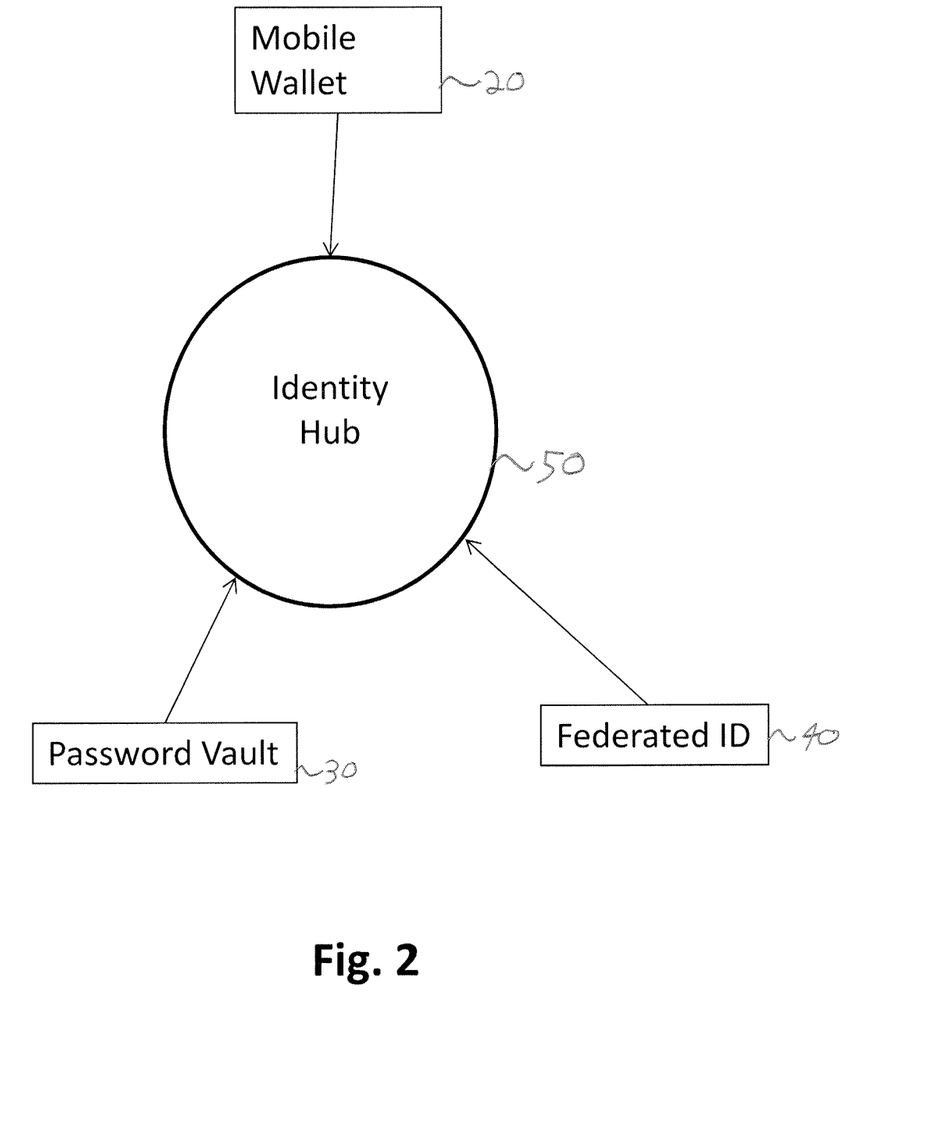
FIG. 2 is a schematic illustration of an integrated identity verification system in accordance with the invention.

One embodiment of the invention is depicted schematically in FIG. 2 as identity hub 50. Identity hub 50 preferably includes at least a password vault 30 in combination with ID federation system 40. In this way, a user can use a single sign-on ID to gain access to any services that have subscribed to the provider's ID federation system, as one can do with ID.ME of McClean, Va. Advantageously, the user also has access to a personal password vault 30 that will allow the user access to sites, apps, and services that are not subscribed to the provider's ID federation system. What is more, as the services to which the user has credentials stored in his/her password vault 30 join the provider's ID federation system 40, the same credentials can easily and seamlessly be migrated from password vault 30 to the ID federation system 40.

One non-limiting example of how the migration process works is as follows. A system user herself stores her own authentication credentials in her password vault 30 for any service she chooses. When the service joins the federation and the user attempts to log into that service via her password vault, the system will query the user to determine if she wants to automatically federate her credentials for this newly federated service. If she agrees, the system extracts the relevant credentials from her password vault and incorporates it into the federated list. Then, the next time the user arrives at the newly federated service, her credentials are automatically provided from the federated list. Optionally, the system can purge the now-federated credentials from her password vault.

The user can also combine the above functionality with a mobile wallet 20 to facilitate financial interactions and transactions between the user and the various services to which the user now has simple yet secure access. Mobile wallet 20 can take the form of any known or to-be-developed form of commerce, including electronic transfers from a bank or e-commerce account, credit and debit account transactions, text message payments, transfer of virtual currency such as Bitcoin, and the like.

Figure 3:
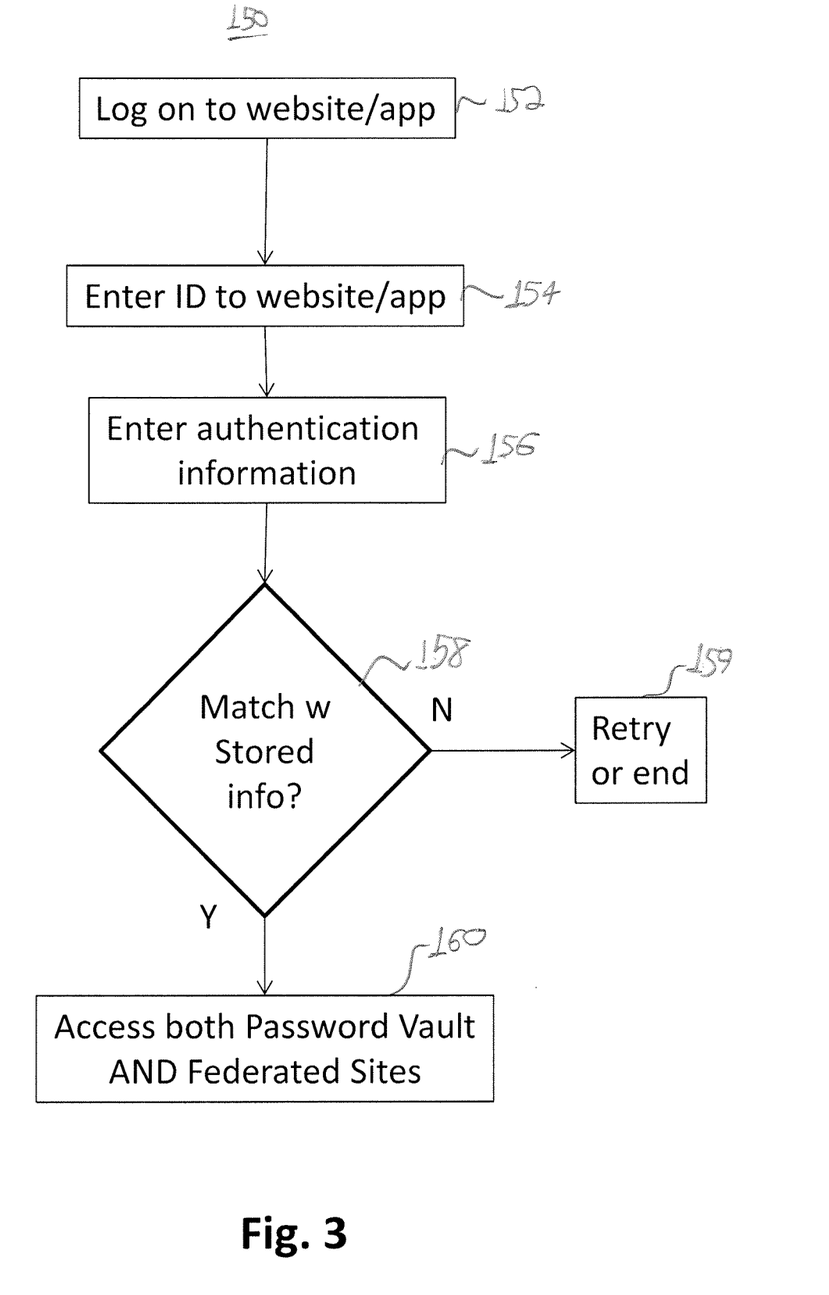
FIG. 3 is a flow chart illustrating operation of an integrated identity verification system in accordance with the invention.

A basic flow chart 150 of user interaction with the inventive system is depicted in FIG. 3. First, at step 152, a user arrives at a log in screen, window, or similar user interface provided for overall entry into the system. Next, the user enters his/her user ID at step 154 and provides authentication information at step 156. User ID and authentication information can both be of any known format, e.g., text-based, provision of a digital certificate or similar electronic file, biometric factors such as voice, fingerprint, retina print, etc. The system may also require that the device being used to access the system be registered as a legitimate device as part of the authentication process. The system determines if the provided user ID and authentication information match corresponding stored information on the system database at step 158. If the user ID and authentication information do not match stored information, the user may be given the opportunity to try again at step 159, and/or the system may lock the device out of the system and/or freeze the account of the attempted-to-be-accessed user. If the user ID and authentication information does match, at step 160 the user is granted access to the ID federation system 40 for subscribing services, his/her password vault 30 for non-subscribing services, and his/her mobile wallet 20 for transacting with such subscribing and non-subscribing services.

Unlike social media log-ins and Single-Sign Ons (SSO) that automatically share a consumer's information with third parties, the inventive system is user-centric; consumers can choose the services with which they wish to share their data, or choose not to share any data at all.

The invention is not limited to the above description. For example, the system can be utilized to disseminate discounts, coupons, and other financial incentives to the user for signing up with system in the first place and encouraging as much system usage as possible. For example, the system can provide increasingly large discount tranches as one enters more credentials into password vault 30 and/or utilizes more federated services via ID federation 40. It is in the ID provider's and the services' best interests for more users to sign up, as there is significantly less risk of fraudulent transactions taking place via use of the inventive system than with conventional online transactions. The ID provider may also make available to the user discounts for using federated services versus non-federated services to encourage use of preferred services for whatever reason.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A computer-based system of electronic identity verification across multiple services, comprising:
   at least one processor; and
   at least one storage medium in communication with said processor, said at least one storage medium storing instructions that when executed by a processor causes the processor to perform:
      receiving, by a password vault software module, a plurality of credential for respective user-chosen services;
      storing, by the password vault software module, the plurality of credentials for the respective user-chosen service;
      performing, by a federated identity software module, a single sign-on credential for a plurality of subscribing services;
      receiving, by a common login software module, logins from a user, wherein the common login software module is accessible to both the password vault software module and the federation identity software module;
      authenticating, by the common login software module, the user based on the logins;
      providing, by the common login software module to the user, access to both the user-chosen services and the plurality of subscribing services based on the authentication;
      migrating stored user credentials in said password vault software module to said federated identity software module when one of the user-chosen service becomes a subscribing service among the plurality of subscribing services.

2. A computer-based system of electronic identity verification across multiple services according to claim 1, further comprising an integrated mobile wallet software module stored on said at least one storage medium and programmed to enable financial transactions between the user and both the user-chosen services and the plurality of subscribing services.

3. A computer-based system of electronic identity verification across multiple services according to claim 2, said mobile wallet software module further comprising an embedded token programmed to support authentication to services that require two-factor authentication.

4. A computer-based system of electronic identity verification across multiple services according to claim 1, wherein the user can select whether to share personal data with a given service or not upon establishing user authentication with the given service.

5. A computer-based system of electronic identity verification across multiple services according to claim 4, wherein the given service is either one of the user-chosen services or one of the plurality of subscribing services.

6. A computer-based of electronic identity verification across multiple services according to claim 1, wherein a device to access said system is registered with said system for additional security.

7. A computer-based method of electronic identity verification across multiple services, comprising the steps of:
   providing at least one processor:

providing at least one storage medium in communication with the at least one processor:

receiving, by a password vault software module, a plurality of credential for respective user-chosen services;

storing, by the password vault software module, the plurality of credentials for the respective user-chosen service;

performing, by a federated identity software module, a single sign-on credential for a plurality of subscribing services;

receiving, by a common login software module, logins from a user, wherein the common login software module is accessible to both the password vault software module and the federation identity software module;

authenticating, by the common login software module, the user based on the logins;

providing, by the common login software module to the user, access to both the user-chosen services and the plurality of subscribing services based on the authentication;

migrating stored user credentials in the password vault software module to the federated identity software module when one of the user-chosen services becomes a subscribing service among the plurality of subscribing services.

8. A computer-based method of electronic identity verification across multiple services according to claim 7, further comprising the step of providing an integrated mobile wallet software module stored on said at least one storage medium and programmed to enable financial transactions between the user and both the user-chosen services and the plurality of subscribing services, wherein when the user logs into the common login software module, the user is authenticated for the mobile wallet software module.

9. A computer-based method of electronic identity verification across multiple services according to claim 8, said mobile wallet software module providing step further comprising the step of providing an embedded token programmed to support authentication to services that require two-factor authentication.

10. A computer-based method of electronic identity verification across multiple services according to claim 7, further comprising the step of enabling the user to select whether to share personal data with a given service or not upon establishing user authentication with the given service.

11. A computer-based method of electronic identity verification across multiple services according to claim 10, wherein the given service is either a user-chosen service or one of the plurality of subscribing services.

12. A computer-based method of electronic identity verification across multiple services according to claim 7, further comprising the step of registering a device used to access said system with said system.

13. A computer-based method of electronic identity verification across multiple services according to claim 7, wherein the migrating stored user credentials further comprising the steps of:

querying the user to determine if the user wants to federate user credentials for a one of the plurality of subscribing services that is also one of the user-chosen services; and based on a user's response during said querying step, extracting relevant credentials from the user's password vault software module and incorporating the relevant credentials into the federated identity software module.

14. A computer-based method of electronic identity verification across multiple services according to claim 13, further comprising the step of purging the relevant credentials from the password vault software module that appear in the federated identity software module after said incorporating step.

15. A non-transitory computer readable medium for electronic identity verification across multiple services wherein the medium comprises computer-readable instructions when executed by a processor causes the processor to carry out the steps of:

receiving, by a password vault software module, a plurality of credential for respective user-chosen services;

storing, by the password vault software module, the plurality of credentials for the respective user-chosen service;

performing, by a federated identity software module, a single sign-on credential for a plurality of subscribing services;

receiving, by a common login software module, logins from a user, wherein the common login software module is accessible to both the password vault software module and the federation identity software module;

authenticating, by the common login software module, the user based on the logins;

providing, by the common login software module to the user, access to both the user-chosen services and the plurality of subscribing services based on the authentication; and migrating stored user credentials in the password vault software module to the federated identity software module when one of the user-chosen services becomes a subscribing service among the plurality of subscribing services.

16. A non-transitory computer readable medium for electronic identity verification across multiple services wherein the medium comprises computer-readable instructions when executed by a processor causes the processor to carry out the steps according to claim 15, further comprising computer-readable instructions when executed by the processor causes the processor to carry out the further step of providing an integrated mobile wallet software module stored on said at least one storage medium and programmed to enable financial transactions between the user and both the user-chosen services and the plurality of subscribing services;

providing access to the mobile wallet software module, the user-chosen services, and the plurality of subscribing service based on the authentication.

17. A non-transitory computer readable medium for electronic identity verification across multiple services wherein the medium comprises computer-readable instructions when executed by a processor causes the processor to carry out the steps according to claim 16, further comprising computer-readable instructions when executed by the processor causes the processor to carry out the further step of providing an embedded token programmed to support authentication to services that require two-factor authentication.

18. A non-transitory computer readable medium for electronic identity verification across multiple services wherein the medium comprises computer-readable instructions when executed by a processor causes the processor to carry out the steps according to claim 15, further comprising computer-readable instructions when executed by the processor causes the processor to carry out the further step of enabling the user to select whether to share personal data with a given service or not upon establishing user authentication with the given service.

19. A non-transitory computer readable medium for electronic identity verification across multiple services wherein the medium comprises computer-readable instructions when executed by a processor causes the processor to carry out the steps according to claim 18, wherein the given service is either a user-chosen service or a one of the plurality of subscribing services.

20. A non-transitory computer readable medium for electronic identity verification across multiple services wherein the medium comprises computer-readable instructions when executed by a processor causes the processor to carry out the steps according to claim 15, further comprising computer-readable instructions when executed by the processor causes the processor to carry out the further step of registering a device used to access said system with said system.

21. A non-transitory computer readable medium for electronic identity verification across multiple services wherein the medium comprises computer-readable instructions when executed by a processor causes the processor to carry out the steps according to claim 15, further comprising computer-readable instructions when executed by the processor causes the processor to carry out the further steps of:
  querying the user to determine if the user wants to federate user credentials for one of the plurality of subscribing services that is also one of the user-chosen services; and
  based on a user's response during said querying step, extracting the relevant credentials from the user's password vault software module and incorporating the relevant credentials into the federated identity software module.

22. A non-transitory computer readable medium for electronic identity verification across multiple services wherein the medium comprises computer-readable instructions when executed by a processor causes the processor to carry out the steps according to claim 15, further comprising computer-readable instructions when executed by the processor causes the processor to carry out the further step of purging the relevant credentials from the password vault module that appear in the federated identity module after the incorporating step.

* * * * *